United States Patent [19]

Oswald et al.

[11] 3,723,559
[45] Mar. 27, 1973

[54] PROCESS FOR THE PRODUCTION OF EPOXIDES CONTAINING NITROGEN AND SULPHUR

[75] Inventors: Richard Alan Oswald, Cambridge; Bernard Peter Stark, Cambridge, both of England

[73] Assignee: Ciba-Geigy AG, Basel, Switzerland

[22] Filed: May 19, 1971

[21] Appl. No.: 145,021

Related U.S. Application Data

[63] Continuation of Ser. No. 769,389, Oct. 21, 1968, abandoned.

[30] Foreign Application Priority Data

Oct. 26, 1967    Great Britain.....................48,796/67

[52] U.S. Cl. ........260/67.6 R, 117/143 A, 260/70 R, 260/249.6, 260/831, 260/833, 260/834, 260/836, 260/45.8 A, 260/45.8 NZ
[51] Int. Cl. ..............................................C08g 9/32
[58] Field of Search ............260/67.6 R, 70 R, 249.6

[56] References Cited

UNITED STATES PATENTS 3,053,797    9/1962    D'Alelio..............................260/67.6
3,145,207    8/1964    Wohnsiedler....................260/249.6

*Primary Examiner*—Edward E. Schain
*Attorney*—Harry Goldsmith and Joseph G. Kolodny

[57] ABSTRACT

Process for preparing a 1,2-epoxide containing nitrogen and sulphur which comprises:

reaction of a monothiol (I) of formula

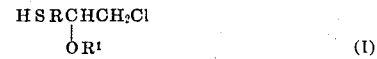 (I)

where R is a divalent organic radical and $OR^1$ is a hydroxyl group or ester group, with a substance (II) containing, directly attached to a nitrogen atom, at least one group of formula

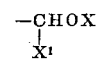

where $X^1$ is hydrogen or a monovalent organic radical, and X is hydrogen or an alkyl or alkenyl group containing not more than six carbon atoms;
  when $OR^1$ denotes an ester group, hydrolyzing this group to a hydroxyl group;
  and dehydrochlorinating the intermediary 1,2-chlorohydrin so obtained to the 1,2-epoxide.

11 Claims, No Drawings

PROCESS FOR THE PRODUCTION OF EPOXIDES CONTAINING NITROGEN AND SULPHUR

This application is a continuation of application Ser. No. 769,389, filed 10/21/68, and now abandoned.

This invention relates to a process for preparing 1,2-epoxides containing both sulphur and nitrogen, to the epoxides obtainable thereby, and to the use of such epoxides.

Epoxide resins, i.e. substances containing on average more than one 1,2-epoxide group per molecule, may react with cross-linking agents such as dicarboxylic acid anhydrides, or may be induced to polymerize through the agency of catalysts such as tertiary amines, to form insoluble, infusible materials having valuable technical properties. Mono-1,2-epoxides may also be converted into useful products by agents which are at least trifunctional with respect to the epoxide group, such as a tetracarboxylic acid dianhydride, or which induce polymerization.

It is known to prepare 1,2-epoxides from compounds having a hydroxylmethyl group directly attached to nitrogen by reaction with epichlorohydrin followed by dehydrochlorination. A disadvantage of this method is that impurities containing non-hydrolysable chlorine (i.e., chlorine present other than a 1,2-chlorohydrin group) may be formed by side reactions such as that which, for an N-methylol compound, may be represented as

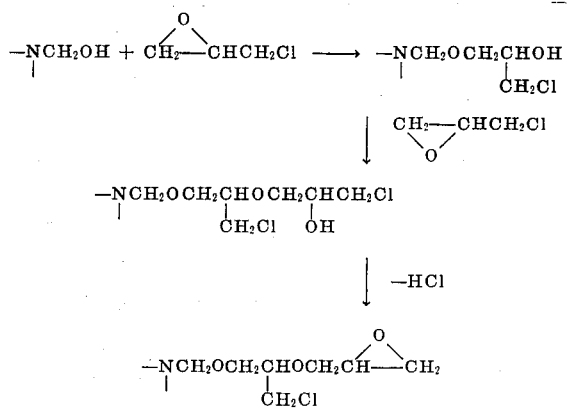

Such impurities may deleteriously affect the electrical properties of epoxide resins.

Another method involves reaction with glycerol α-monochlorohydrin. For an N-methylol compound, the reaction may be represented as

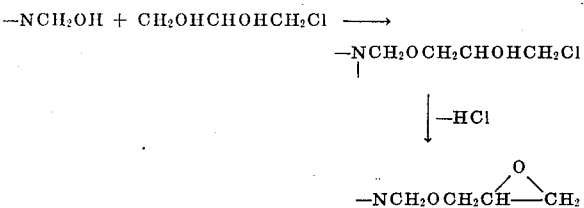

This method too is inefficient, because the secondary hydroxyl in glycerol α-monochlorohydrin may react, giving rise to a 1,3-chlorohydrin (which cannot be directly converted into a 1,2-epoxide), or both the primary and secondary hydroxyls may react, linking two molecules of the hydroxyalkyl component. This linking reaction may have undesirable consequences, such as loss of solubility or even gelation.

Yet another method involves reaction of the N-methylol compound with glycerol-1,3-dichlorohydrin in the presence of alkali. This method is open to the objection that epichlorohydrin may be formed and react with the secondary hydroxyl in the N-(3-chloro-2-hydroxypropoxymethyl) group, again giving products containing non-hydrolysable chlorine.

It has now been found that a substance containing an N-hydroxymethyl, an N-alkoxymethyl group or an N-alkenoxymethyl group can be readily converted, by reaction with a monothiol - 1,2-chlorohydrin, into a 1,2-chlorohydrin in good yield and with a high degree of purity: the product can be dehydrochlorinated in a known manner to a 1,2-epoxide. It is believed, but the usefulness of this invention does not depend on the truth of this belief, that in the monothiol (I) (which may be represented by HSRCHOHCH$_2$Cl, where R denotes a divalent organic radical such as an alkylene group), the thiol group reacts preferentially with the hydroxymethyl, alkoxymethyl or alkenoxymethyl (—OX) group, thus:

—NCH$_2$OX + HSRCHOHCH$_2$Cl ⟶

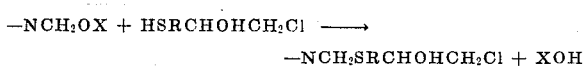

This view is supported by the facts that the thiol content of the reaction mixture decreases to a negligibly low value and that the 1,2-chlorohydrin content of the mixture before dehydrochlorination indicates that little, if any, reaction occurs at the indicated hydroxyl group in the monothiol (I).

It has also been found that certain secondary alcohols which are compounds containing a substituted N-hydroxymethyl group, and their ethers, may similarly be etherified with a monothiol-1,2-chlorohydrin and the product dehydrochlorinated to a 1,2-epoxide.

If desired, an ester of the thiol chlorohydrin may be used, the ester group being converted into a hydroxyl group before dehydrochlorination.

The present invention accordingly provides a process for preparing a 1,2-epoxide containing nitrogen and sulphur which comprises reaction of a monothiol (I) of formula

   .I where R is a divalent organic radical and OR$^1$ is a hydroxyl group or ester group, with a substance (II) containing, directly attached to a nitrogen atom, at least one group of formula

where X$^1$ is hydrogen or an organic radical, and X is hydrogen or an alkyl or alkenyl group containing not more than six carbon atoms; when OR$^1$ denotes an ester group, hydrolyzing this group to a hydroxyl group; and dehydrochlorinating the intermediary 1,2-chlorohydrin so obtained to the 1,2-epoxide.

Reaction between the monothiol (I) and the substance (II) to form the intermediary 1,2-chlorohydrin is preferably carried out by heating the reactants together at a temperature within the range 30° to 150° C., especially within the range 50° to 125° C. Preferably a catalyst for the etherification or transetherification reaction is present, especially a catalytic amount of a water-soluble, strong acid such as toluene-p-sulphonic acid, naphthalene-2-sulphonic acid or hydrogen chloride. This reaction may be carried out in an inert solvent such as benzene or toluene.

The amount of monothiol (I) employed may be varied within wide limits. Usually it will be employed in a quantity sufficient to supply at least 1, suitable 1 to 1.5, mercaptan groups per N-hydroxymethyl, N-alkoxymethyl or N-alkenoxymethyl group in the substance (II), but an excess may be used if desired; on the other hand, less than the stoichiometric amount may be used if it is desired to replace only some of the N-hydroxymethyl, N-alkoxymethyl or N-alkenoxymethyl groups.

Conversion of the intermediary 1,2-chlorohydrin to the 1,2-epoxide is carried out by the usual methods for such a dehydrochlorination, conveniently by contacting with an alkali metal hydroxide in aqueous solution, but alcoholic or aqueous-alcoholic solution may also be used. It is generally desirable to carry out the dehydrochlorination at a temperature within the range 30°–80° C.

R in the formula of the monothiol (I) may, for example, denote a radical linked by a carbon atom to the indicated —SH group and by the same or a different carbon atom to the indicated

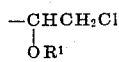

group. Preferably R denotes a saturated alkylene group which contains from one to 10 carbon atoms and which may contain one or more oxygen and/or sulphur atoms in the alkylene chain, or a saturated alicyclic group containing one to three carbocyclic rings and from five to 12 carbon atoms.

Preferably $OR^1$ denotes a hydroxyl group, but it may also denote an ester group $X^2COO—$ or $X^2SO_3—$, where $X^2$ is an alkyl, cycloalkyl, aryl or aralkyl residue.

The particular preferred monothiol (I) is 3-mercapto-1-chloropropan-2-ol (also known as "thiochlorohydrin"), i.e., R denotes —$CH_2$—, but there may also be used those of the formulae:

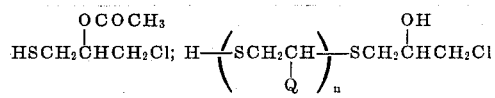

(where Q denotes hydrogen or lower alkyl and $n$ is an integer of value 1 or more);

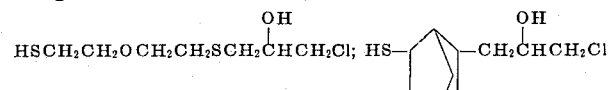

and

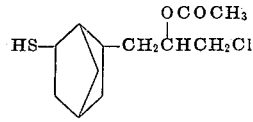

Substance (II) should not, when $OR^1$ in the monothiol (I) denotes hydroxyl, contain groups which react with that hydroxyl, e.g., isocyanate or acid chloride groups. It (II) further should not contain groups which react readily with the 1,2-epoxide groups produced on dehydrochlorinating the intermediary 1,2-chlorohydrin, because the product will usually be unstable. Such groups include primary or secondary amine, phenolic hydroxyl, free carboxylic or sulphonic acid, acyl halide or sulphonyl halide, and acid anhydride groups.

In substance (II), the nitrogen atom bearing the N-hydroxymethyl, N-alkoxymethyl or N-alkenoxymethyl group is preferably directly linked to a —CO— group or to a carbon atom of a 1,3,5-triazine nucleus. The more preferred such substances are those wherein $X^1$ denotes hydrogen.

As the substance (II) in which the nitrogen atom having the N-hydroxymethyl, N-alkoxymethyl or N-alkenoxymethyl group is directly linked to a —CO— group, there may be used N-hydroxymethyl carbamates such as ethyl N-hydroxymethylcarbamate; N-hydroxymethyl, N-alkoxymethyl or N-alkenoxymethyl derivatives of acyclic amides, such as N-hydroxymethylacrylamide, N-allyloxymethylacrylamide, N-hydroxymethylstearamide, and especially a urea-formaldehyde condensation product which may be partially or fully etherified by alkyl or alkenyl groups each containing not more than six carbon atoms, such as monomethylol urea and dimethylol urea and their alkyl ethers, and urea-formaldehyde resins and their alkyl ethers. There may also be used an N-hydroxymethyl cyclic urea which may be partially or fully etherified by alkyl or alkenyl groups each containing not more than six carbon atoms, especially N,N'-bis(hydroxymethyl)-,N,N'-bis(alkoxymethyl) and N,N'-bis(alkenoxymethyl) cyclic ureas, such as those of formula

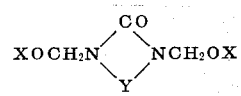

where Y denotes —$CH_2CH_2$—, —$CH_2CH_2CH_2$—, —$CH_2OCH_2$—,

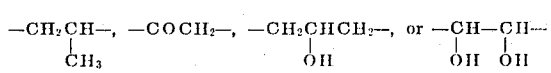

and each X has the meaning previously assigned. Examples of such cyclic urea compounds are N,N'-bis(methoxymethyl)imidazolid-2-one, N,N'-bis(hydroxymethyl)hexahydro-2H-pyrimid-2-one, N,N'-bis(n-butoxymethyl) and N,N'-bis(allyloxymethyl)-tetrahydro-1-oxa-3,5-diazin-4-one, N,N'-bis(ethoxymethyl)-4-methylimidazolid-2-one, N,N'-bis(hydroxymethyl)hydantoin, N,N'-bis(methoxymethyl)-5-hydroxyhexahydro-2H-pyrimid-2-one, and N,N'-bis(hydroxymethyl)14,5-dihydroxyimidazolid-2-one.

There may also be used N-hydroxymethylated, N-alkoxymethylated or N-alkenoxymethylated derivatives of polyamides obtained by polymerizing an ethylenically unsaturated amide such as acrylamide. These polymers may also contain copolymerized units of other ethylenically-unsaturated compounds. The polyamides may also be of the nylon type, obtained by condensing a diamine such as hexamethylenediamine with a dicarboxylic acid such as adipic acid. Suitable N-hydroxymethylated or N-alkoxymethylated nylons are available under the designations "Zytel 61" (E.I. du Pont de Nemours), "Maranyl C109/P," now sold under the designation "Calaton CB", (Imperial Chemical Industries), "Ultramid LR102" and "Ultramid IC"

(Badische Anilin-und Soda Fabrik), and "Technyl TS2" and "Technyl MB2" (Rhodiaceta).

As the substance (II) in which the nitrogen atom bearing the N-hydroxymethyl, N-alkoxymethyl or N-alkenoxymethyl group is directly linked to a 1,3,5-triazine nucleus, there is preferably used a melamine-formaldehyde condensation product which may be partially or fully etherified by alkyl or alkenyl groups each containing not more than six carbon atoms, such as hexa(hydroxymethyl)melamine, hexa(methoxymethyl)melamine, penta(methoxymethyl)hydroxymethyl melamine, or tri(n-butoxymethyl)- tri(hydroxymethyl)melamine. But there may also be used N-hydroxymethyl or N-alkoxymethyl guanamines, such as hydroxymethyl-acetoguanamine, -benzoguanamine or -adipoguanamine.

As the substance (II) containing the group 

where $X^1$ denotes an organic radical, may be used compounds of the formulae

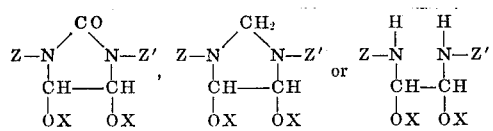

where X has the meanings previously assigned, and Z and Z', which may be the same or different, each represent hydrogen or an organic monovalent radical such as an alkyl, acyl, alkenoyl, or alkoxycarbonyl group. Examples of such compounds are 4,5-dihydroxyimidazolid-2-one, otherwise known as glycoxal monourein, of formula

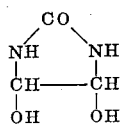

and other glyoxal addition products such as those of the formulae

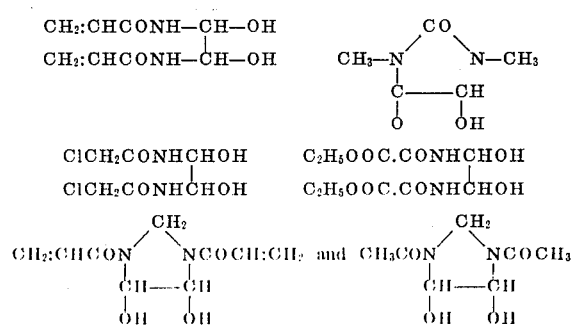

The new process may be applied to substances containing one or more alkoxymethyl, alkenoxymethyl or hydroxymethyl groups attached to the same or different nitrogen atoms. There may thus be obtained products having one or more 1,2-chlorohydrin groups, and which may be converted into mono- and poly- 1,2-epoxides by conventional procedures. By appropriate selection of the molar ratio of the reactants, 1,2-chlorohydrins may be obtained which retain one or more hydroxymethyl, alkoxymethyl or alkenoxymethyl groups: these may then be converted into hydroxymethyl-, alkoxymethyl or alkenoxymethyl mono- or poly- 1,2-epoxides.

The process of this invention may also be applied to a substance (II) containing one or more 1,2-epoxide groups directly attached to carbon, to oxygen, to sulphur or to an amine nitrogen atom, so that products having epoxide groups of differing reactivity may be obtained.

Compounds containing, per molecule, one or more groups of formula

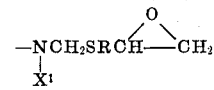

where R and $X^1$ have the meanings previously assigned, are believed to be new. The preferred compounds are those of formula

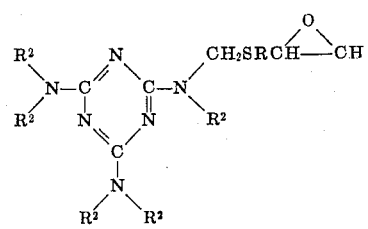

where each $R^2$ denotes hydrogen, hydroxymethyl, an alkoxymethyl or alkenoxymethyl group containing not more than seven carbon atoms, or a group of formula

particularly compounds which further conform to the formula

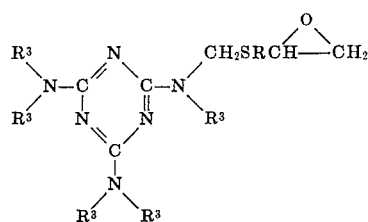

III wherein from two to five of $R^3$ each denotes identical groups of formula

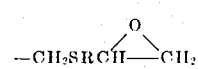

where R has the same meaning as in the

group shown in formula III, and any remaining $R^3$ denote hydrogen, hydroxymethyl, or an alkoxymethyl group containing not more than five carbon atoms; those of formula

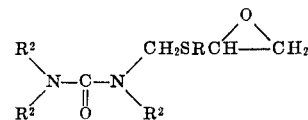

IV where R has the meaning previously assigned, particularly compounds which further conform to the formula

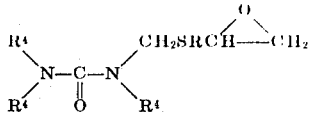

where one R⁴ denotes a

group, R having the same meaning as in the

group shown in formula IV, and the remaining R⁴ each denote hydrogen, hydroxymethyl, or an alkoxymethyl group containing not more than five carbon atoms; those of formula

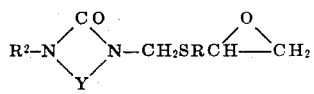

where Y and R² have the meaning previously assigned, particularly such compounds further conforming to the formula

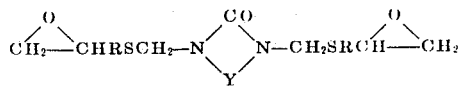

wherein the two groups denoted by R are the same; and those of formula

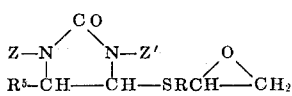

or

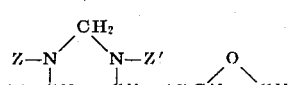

or

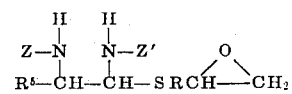

where Z, Z' and R have the meanings previously assigned and R⁵ denotes hydroxyl or an alkoxy or alkenoxy group containing not more than six carbon atoms, especially those further conforming to the formula

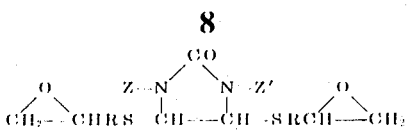

or

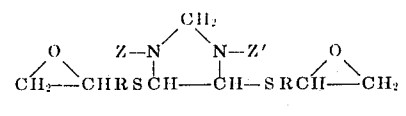

or

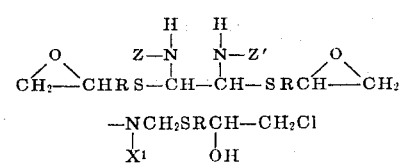

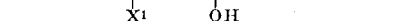

where the two groups denoted by R in any one formula are the same.

The corresponding 1,2-chlorohydrins, i.e., those containing one or more groups of formula

—CH——CH₂
   \\O/ are also new.

When the compound (II) contains ethylenic unsaturation, addition of the monothiol (I) across the ethylenic double bond may occur, particularly if a free-radical catalyst be present. Such addition is described in our copending British application Ser. No. 48798/67, filed on even date herewith. The occurrence of this side-reaction is not disadvantageous, because a 1,2-chlorohydrin is obtained which can be dehydrochlorinated to a 1,2-epoxide by conventional means.

The monoepoxides and polyepoxides of this invention may be used to stabilize chlorine-containing organic resins, such as poly(vinyl chloride), against the degradative effects of heat and light, and for the treatment of cellulosic textiles to impart mechanical finishing, crease-proofing and other effects. Such monoepoxides and polyepoxides containing unreacted N-hydroxymethyl, N-alkoxymethyl or N-alkenoxymethyl (where alkoxymethyl and alkenoxymethyl are as previously defined) groups are of particular interest as textile-treating agents. The monoepoxides may also be used as reactive diluents in epoxide resin compositions. The polyepoxides of this invention react with the usual curing agents for epoxide resins and can therefore be cured, i.e., converted into cross-linked, insoluble, infusible bodies, by reaction with such curing agents.

Accordingly, there are provided curable compositions comprising an epoxide resin, a curing agent therefor, and a mono-1,2-epoxide of the present invention; and curable compositions comprising a poly-1,2-epoxide of this invention and a curing agent for epoxide resins.

The curing (or hardening) agent may be a cross-linked agent such as a polyamine, e.g., aliphatic polyamines such as diethylenetriamine, triethylenetetramine, N-(2-hydroxyethyl)-, N-(2-hydroxypropyl)- and N-(2-cyanoethyl)-diethylenetriamine, tetraethylenepentamine, propylenediamine, propane-1,3-diamine, and 2,2,4-, and 2,3,3-trimethylhexane-1,6-diamines; cycloaliphatic polyamines such as bis(4-aminocyclohexyl)methane, bis(4-amino-3-methylcyclohexyl)methane, 2,2-bis(4-aminocyclohexyl)propane, and 3-aminomethyl-3,5,5-trimethylcyclohexylamine (isophoronediamine); and aromatic polyamines such as bis(4-aminophenyl)methane, aniline-formaldehyde resins, bis(4-aminophenyl) sulphone, and p- and m-phenylene diamines; and heterocyclic polyamines such as N-(2-aminoethyl)-piperazine. There may also be used poly(aminoamides), e.g., those prepared from aliphatic polyamines and dimerized or trimerized fatty acids; dicyandiamide; polycarboxylic acid anhydrides such as phthalic anhydride, 1,2,3,6-tetrahydrophthalic anhydride, methyl-1,2,3,6-tetrahydrophthalic anhydride, methylendomethylene-1,2,3,6-tetrahydrophthalic anhydride, hexachloroendomethylene-1,2,3,6-tetrahydrophthalic anhydride, endomethylene-1,2,3,6-tetrahydrophthalic anhydride, hexahydrophthalic anhydride, benzophenone-3,3',4,4-tetracarboxylic acid dianhydride, pyromellitic dianhydride, maleic anhydride, succinic anhydride, dodecenylsuccinic anhydride, nonenylsuccinic anhydride, polysebacic anhydride, and polyazelaic anhydride, as well as polycarboxylic acids such as phthalic acid, 1,2,3,6-tetrahydrophthalic acid, hexahydrophthalic acid, isophthalic acid, terephthalic acid, adipic acid, succinic acid, dodecenylsuccinic acid, maleic acid, citric acid, mellitic acid and pyromellitic acid; and polyhydric phenols such as resorcinol, hydroquinone, 2,2-bis (4-hydroxyphenyl)propane and resins formed between formaldehyde and phenols such as phenol itself or p-chlorophenol.

There may also be used catalytic curing agents, including tertiary amines such as 2,4,6-tris(dimethylaminomethyl)phenol, N-benzyldimethylamine, triethanolamine; alkali metal alkoxides of alcohols such as 2,4-dihydroxy-3-hydroxymethylpentane; stannous salts of alkanoic acids such as stannous octoate; and Friedel-Crafts catalysts such as boron trifluoride and its complexes.

Particularly suitable compositions are those containing a polyepoxide of this invention and
a. a polyamine in quantity sufficient to supply 0.8 to 1.2 amino-hydrogen equivalents per 1,2-epoxide group of the polyepoxide; or
b. a polycarboxylic acid anhydride in quantity sufficient to supply 0.7 to 1.2 carboxyl equivalents per 1,2-epoxide group of the polyepoxide; or
c. sufficient of a tertiary amine catalytic curing agent to convert the polyepoxide into an infusible, insoluble product.

The aforesaid curable compositions may contain other epoxide resins, especially those wherein the 1,2-epoxide groups are terminal and of formula:

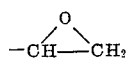

Such resins include, for example, polyglycidyl esters obtainable by the reaction of a substance containing two or more carboxylic acid groups with epichlorohydrin or glycerol dichlorohydrin in the presence of an alkali. Such polyglycidyl esters may be derived from aliphatic carboxylic acids, e.g., oxalic acid, succinic acid, adipic acid, sebacic acid, or dimerized or trimerized linoleic acid; from cycloaliphatic carboxylic acids such as hexahydrophthalic acid and tetrahydrophthalic acid; and from aromatic carboxylic acids such as phthalic acid, isophthalic acid and terephthalic acid.

Other epoxide resins which may be used include polyglycidyl ethers, such as those obtainable by the reaction of a substance containing two or more alcoholic hydroxyl groups or two or more phenolic hydroxyl groups with epichlorohydrin or glycerol dichlorohydrin under alkaline conditions or, alternatively, in the presence of an acidic catalyst with subsequent treatment with alkali. Such polyglycidyl ethers may be derived from aliphatic alcohols, for example, ethylene glycol and poly(oxyethylene) glycols such as diethylene glycol and triethylene glycol, propylene glycol and poly(oxypropylene) glycols, propane-1,3-diol, butane-1,4-diol, poly (oxybutylene) glycols, pentane-1,5-diol, hexane-1,6-diol, hexane-2,4,6-triol, glycerol, 1,1,1-trimethylol propane, pentaerythritol and poly(epichlorohydrin); from cycloaliphatic alcohols, such as quinitol, resorcitol, bis(4-hydroxycyclohexyl)methane and 2,2-bis(4-hydroxycyclohexyl)propane; and from alcohols containing aromatic nuclei, such as adducts of alkylene oxides with amines, e.g., N,N-bis(2-hydroxyethyl)-aniline and 4,4'-bis(2-hydroxyethylamino) diphenylmethane or with phenols, e.g., 2,2-bis(p-(2-hydroxyethoxy) phenylpropane or 2,2-bis(p-(2-hydroxypropoxyphenyl)propane.

Preferably the polyglycidyl ethers are derived from a substance containing two or more phenolic hydroxyl groups, for example, resorcinol, catechol, hydroquinone, bis(4-hydroxyphenyl)methane, 1,1,2,2-tetrakis (4-hydroxyphenyl)ethane, novolacs formed between aldehydes such as acetaldehyde, chloral or furfuraldeyde and phenols such as phenol itself, p-chlorophenol, p-cresol or p-ter- butylphenol, 4,4'-dihydroxydiphenyl, bis(4-hydroxyphenyl) sulphone, and, especially pnenol-formaldehyde novolac resins or 2,2-bis(4-hydroxyphenyl)propane (otherwise known as bisphenol A).

There may further be employed poly(N-glycidyl) compounds, such as are, for example, obtained by the dehydrohalogenation of the reaction products of epichlorohydrin and amines containing at least two hydrogen atoms directly attached to nitrogen, such as aniline, n-butylamine bis(4-aminophenyl)methane, bis(4-aminophenyl) sulphone, or bis(4-methylaminophenyl)methane. Other poly(N-glycidyl) compounds that may be used include triglycidyl isocyanurate, N,N'-diglycidyl derivatives of cyclic alkylene ureas such as ethyleneurea and 1,3-propyleneurea, and N,N'-digylcidyl derivatives of hydantoins such as 5,5-dimethylhydantoin.

Polyepoxides having terminal 1,2-epoxide groups attached to different kinds of atoms may be employed, e.g., the N,N,O-triglycidyl derivative of p-aminophenol, or glycidyl ether-glycidyl esters of substances such as salicylic acid, 4,4-bis(p-hydroxyphenyl)pentanoic acid, or phenolphthalein.

Other epoxy resins may contain at least one 1,2-epoxide group which is not terminal, such as vinylcyclohexene dioxide, limonene dioxide, dicyclopentadiene dioxide, 3,4-epoxydihydrodicyclopentadienyl glycidyl ether, the bis(3,4-epoxydihydrodicyclopentadienyl) ether of ethylene glycol, 3,4-epoxycyclohexylmethyl 3', 4'-epoxycyclohexanecarboxylate and its 6,6'-dimethyl derivative, the bis(3,4-epoxycyclohexanecarboxylate) of ethylene glycol, the cyclic acetal formed between 3,4-epoxycyclohexanecarboxyaldehyde and 1,1-bis(hydroxymethyl)-3,4-epoxycyclohexane, and epoxidized polybutadienes or copolymers of butadiene with ethylenic compounds such as styrene and vinyl acetate.

The curable compositions may also contain solvents, reactive diluents, fillers, plasticizers, suspending agents or coloring agents. They may be used, e.g., as casting, potting, encapsulating, coating or adhesive resins.

The following examples illustrate the invention. 1,2-Chlorohydrin contents were determined by titration with 0.5 N-methanolic sodium methoxide, thiol contents by titration in isopropanol with 0.1 N-aqueous iodine, and 1,2-epoxide contents by titration with 0.1 N-perchloric acid in glacial acetic acid in the presence of tetraethylammonium bromide as catalyst, crystal violet being used as indicator. 3-Chloro-1-mercaptopropan-2-ol was prepared as described by Sjöberg, Ber. deutsch. Chem. Ges., 1941, 74 B, 64. Unless otherwise indicated, heat distortion temperatures were measured by a modification of the Martens D.I.N. procedure in which a smaller sample, viz. 76mm. × 19mm. × 3.2mm. (compared with a sample size of 120mm. × 15mm. × 10mm. specified in the D.I.N. procedure), and a maximum fiber stress of 12.5kg./sq.cm. (compared with the specified 50kg./sq.cm.) were employed. Such results, while not exactly equivalent to those which would be obtained by the D.I.N. procedure, are, however, mutually comparable.

EXAMPLE I

A methylated melamine-formaldehyde resin, which was solid at room temperature and contained on average 5 methoxymethyl groups and 1 hydroxymethyl group per molecule (16.25 g., 0.0417 mole), 3-chloro-1-mercaptopropan-2-ol (31.6 g., 0.25 mole) and toluene-p-sulphonic acid 0.1 g.) were stirred at 60°C. for 12 hours. The thiol content of the mixture was then 0.03 equiv./kg., the initial value being 1.845 equiv./kg. This mixture was next stirred at 60° C. for 18 hours with sodium hydroxide (15 g., 0.375 mole) in water (30 ml.). The organic layer was separated, washed with water until neutral, and the solvent distilled off under vacuum. The residue, "Resin A," (25.9 g.) contained 6.20 epoxide equiv./kg., and consisted essentially of the compound of formula

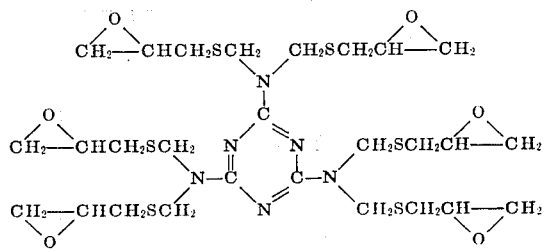

Resin A (6.85 g.) was mixed with hexahydrophthalic anhydride (5.7 g.) and N-benzyldimethylamine (0.1 g.), and the mixture cured by heating for 1 hour at 100° C. plus 4 hours at 150° C. to afford a material having a heat distortion temperature of 130° C.

EXAMPLE II

A methylated melamine-formaldehyde resin, which was liquid at room temperature and which contained on average 4.6 methoxymethyl groups and 1.4 hydroxymethyl groups per molecule (65 g., 0.166 mole), 3-chloro-1-mercaptopropan-2-ol (63.2 g., 0.5 mole) and toluene-p-sulphonic acid (0.1 g.) were heated at 60° C. for 16 hours. The mixture, which then had a thiol content of 0.02 equiv./kg. compared with an initial value of 3.47 equiv./kg., was treated with sodium hydroxide (40 g., 1 mole) in water (80 ml.) for 18 hours at 60° C., and the desired product isolated as described in Example I. There was obtained 75.6 g. of a viscous liquid ("Resin B") with an epoxide content of 4.22 equiv./kg. (79 percent of theory) and a 1,2-chlorohydrin content of only 0.06 equiv./kg.

A 10.5 g. sample of Resin B was cured with 1.1 g. of triethylenetetramine for 3 days at 20° C.: the hardened product had a heat distortion temperature of 56° C.

A second sample, of 7 g., was cured by heating with 0.7 g. of 2,4,6-tris(dimethylaminomethyl)phenol for 2 hours at 70° C. to afford a product having a Short D hardness value of 89.7.

EXAMPLE III

An addition product of propylene sulphide and thiochlorohydrin was prepared as follows.

Propylene sulphide (37 g., 0.5 mole) was added slowly with stirring to 3-chloro-1-mercaptopropan-2-ol (63.25 g., 0.5 mole) containing 0.2 ml. of boron trifluoride etherate at 60° C. in a nitrogen atmosphere. he mixture was heated at 100° C. under a vacuum of 14mm.Hg to remove volatile materials, and there remained 98 g. (98,2 percent of theory) of the desired adduct: it had a thiol content of 4.77 equiv./kg. (95.5 percent of theory).

This adduct (50.5 g., 0.25 mole) was heated at 60° C. in the presence of 0.1 g. of toluene-p-sulphonic acid with 32.5 g. (0.083 mole) of the methylated melamine-formaldehyde resin employed in Example II.

The chlorohydrin, which had a thiol content of less than 0.01 equiv./kg. compared with an initial value of 1.89 equiv./kg., was stirred with sodium hydroxide (15 g., 0.375 mole) in water (30 ml.) for 18 hours at 60° C., and the mixture was then worked up as described in Example I. The product (43.25 g.) was a liquid containing 3.12 epoxide equiv./kg. (92.5 percent of theory).

EXAMPLE IV

3-Chloro-1-mercaptopropan-2-ol (63.25 g., 0.50 mole), dimethylolurea (30 g., 0.25 mole) and toluene-p-sulphonic acid (0.1 g.) were mixed at 20° C., and heated at 60° C. for 1 hour. The reaction mixture then had a thiol content of 0.05 equiv./kg. (initial value, 5.36 equiv./kg.) and a chlorohydrin content of 5.91 equiv./kg. (99.5 percent of theory). A 38 g. (0.226 mole) sample of this chlorohydrin was dissolved in 50 ml. of isopropanol and stirred at 20° to 29° C. while a solution of 12.6 g. (0.226 mole) potassium hydroxide in 300 ml. isopropanol was added dropwise. Carbon dioxide was bubbled through, and after the mixture had been filtered it was heated at 100° C. under a vacuum of 0.1mm.Hg. The residue had an epoxide content of 4.83 equiv./kg. (64 percent of theory) and a 1,2-chlorohydrin content of 0.76 equiv./kg.

EXAMPLE V

N,N'-bis(Methoxymethyl) uron (N,N'-bis(methoxymethyl)tetrahydro-1-oxa-3,5-diazin-4-one) (41 g.,0.21 mole) and toluene p-sulphonic acid (0.3 g.) were stirred at 23° C. under nitrogen, and 50 g. (0.396 mole) of 3-chloro-1-mercaptopropan-2-ol was added dropwise, the temperature of the mixture being kept below 30° C. The mixture was heated at 100° C. under a vacuum of 14mm.Hg to remove methanol formed. There remained 75.4 g. (97.6 percent of theory) of a viscous liquid having a thiol content of 0.04 equiv./kg., and a chlorohydrin content of 4.81 equiv./kg. (91.1 percent of theory).

A 73 g. portion (0.192 mole) of this chlorohydrin was dissolved in 150 ml. of isopropanol and stirred at 23° C., and 22.4 g. (0.4 mole) of potassium hydroxide dissolved in 400 ml. of isopropanol was added slowly. After the reaction, during which crystals of potassium chloride separated, had finished, carbon dioxide was passed in to convert any remaining potassium hydroxide into carbonate. The mixture was filtered, and heated to 100° C. at 14mm.Hg to remove isopropanol. The resulting cloudy liquid was dissolved in benzene, filtered, and heated at 100° C./0.1mm. Hg to remove solvent. The residue, a pale yellow liquid, weighed 55.9 g. and contained 4.39 epoxide equiv./kg. (67.1 percent of theory).

EXAMPLE VI

N-Methoxymethylacetamide (20.6 g., 0.2 mole) and 25.3 g. (0.2 mole) of 3-chloro-1-mercaptopropan-2-ol were stirred in the presence of 0.3 g. toluene-p-sulphonic acid at 23° C. under nitrogen for 48 hours, and then heated at 100° C. under a vacuum of 14 mm.Hg to remove methanol liberated. The residue was stirred at 23° C. with 11.6 g. of potassium hydroxide in 300 ml. of isopropanol, and the mixture was cooled to 0° C., treated with carbon dioxide and filtered, and heated to 100° C. at 14 mm.Hg to remove isopropanol. The residue (approximately 20 g.) contained 1.20 epoxide equiv./kg.

I claim:
1. Process for preparing a 1,2-epoxide containing nitrogen and sulphur which comprises:
   a. heating at a temperature within the range of about 30° to about 150° C a monothiol (I) of formula

(I)

wherein R denotes a saturated alkylene group which contains at least one and at most 10 carbon atoms and which may contain one atom selected from the group consisting of oxygen and sulfur in the alkylene chain and $R^1$ is selected from the class consisting of hydrogen, an ester group of formula $X^2CO-$, and an ester group of formula $X^2SO_2-$, where $X^2$ is a member of the group consisting of alkyl, cycloalkyl, aryl, and aralkyl residue;
   with a compound (II) selected from the group consisting of melamine-formaldehyde condensation product (II) of formula

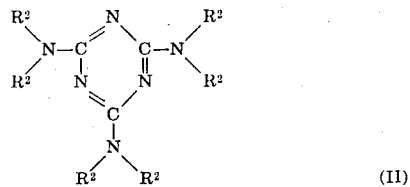

(II)

wherein each $R^2$ is selected from the group consisting of hydrogen atoms and groups of formula $-CH_2OX$, X being chosen from the group consisting of hydrogen atoms, alkyl groups containing up to six carbon atoms, and alkenyl groups containing up to six carbon atoms, not more than five groups $R^2$ representing hydrogen atoms, urea-formaldehyde condensation product or a urea-formaldehyde condensation product which is partially or fully etherified by alkyl or alkenyl groups each containing not more than six carbon atoms and N-hydroxy-methyl cyclic urea or a n-hydroxymethyl cyclic urea which is partially or fully etherified by alkyl or alkenyl groups each containing not more than six carbon atoms, in which reaction the thiol group of monothiol (I) condenses with the $-OX$ group of compound (II) with elimination of $H-O-X$;
   when $OR_1$ denotes an ester group, hydrolyzing this group to a hydroxyl group;
   and dehydrochlorinating the intermediary 1,2-chlorohydrin so obtained to the 1,2-epoxide.

2. Process according to claim 1, wherein the compound (II) is a urea-formaldehyde condensation product or a urea-formaldehyde condensation product which is partially or fully etherified by alkyl or alkenyl groups each containing not more than six carbon atoms.

3. Process according to claim 1, wherein the compound (II) is an N-hydroxymethyl cyclic urea or a n-hydroxymethyl cyclic urea which is partially or fully etherified by alkyl or alkenyl groups each containing not more than six carbon atoms.

4. Process according to claim 11, wherein the compound (II) is an N,N'-bis(hydroxymethyl)-, N,N'-bis(alkoxymethyl)- or N,N'-bis(alkenoxymethyl)-cyclic urea of formula

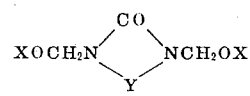

where Y denotes $-CH_2CH_2-$, $-CH_2CH_2CH_2-$, $-CH_2OCH_2-$,

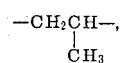

$-COCH_2-$,

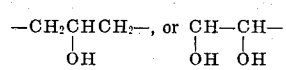

and each X has the meaning asigned in claim 1.

5. Process for preparing a 1,2-epoxide containing nitrogen and sulfur which comprises:
   a. heating at a temperature within the range of about 130° C to about 150° C a monothiol (I) of formula

(I)

wherein R denotes a saturated alkylene group which contains at least one and at most ten carbon atoms and which may contain one atom selected from the group consisting of oxygen and sulfur in the alkylene chain and $R^1$ is selected from the class consisting of hydrogen, an ester group of formula $X^2CO-$, and an ester group of formula $X^2SO_2-$, where $X^2$ is a member of the group consisting of alkyl, cycloalkyl, aryl, and aralkyl residue, with a melamine-formaldehyde condensation product (II) of formula

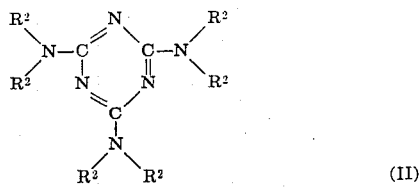

(II)

wherein each $R^2$ is selected from the group consisting of hydrogen atoms and groups of formula —$CH_2OX$, X being chosen from the group consisting of hydrogen atoms, alkyl groups containing up to six carbon atoms, and alkenyl groups containing up to six carbon atoms, not more than five groups $R^2$ representing hydrogen atoms; whereby the thiol group of monothiol (I) condenses with the —OX group of compound (II) with elimination of H—OX;

b. when $OR^1$ denotes an ester group, hydrolyzing this group to a hydroxyl group; and c. dehydrochlorinating the intermediary 1,2-chlorohydrin so obtained to the 1,2-epoxide.

6. Process according to claim 5 wherein the monothiol (I) and the melamine-formaldehyde condensation produce (II) are heated together at from about 50° C to about 125° C.

7. Process according to claim 5 wherein reaction between the monothiol (I) and the melamine-formaldehyde condensation product (II) is effected in the presence of a catalyst for the reaction of the thiol group of monothiol (I) with the —OX groups of compound (II), which catalyst is a water-soluble strong acid.

8. Process according to claim 7, wherein the catalyst is selected from the group comprising toluene-p-sulfonic acid, naphthalene-2-sulfonic acid, and hydrogen chloride.

9. Process according to claim 5, wherein there is used an amount of the monothiol (I) sufficient to supply at least one thiol per group of formula —$NCHH_2OX$ in compound (II).

10. Process according to claim 5, wherein $R^1$ denotes hydrogen.

11. Process according to claim 5, wherein R denotes —$CH_2$—.

* * * * *